United States Patent Office 2,773,049
Patented Dec. 4, 1956

2,773,049

SALICYLIC ACID ESTER AS COLOR INHIBITOR FOR POLYESTER-MONOMER RESINS

Merle Cowee, Milwaukee, Wis., assignor to Pittsburgh Plate Glass Company, Allegheny County, Pa., a corporation of Pennsylvania No Drawing. Application December 7, 1953, Serial No. 396,737

8 Claims. (Cl. 260—45.4)

This invention relates to interpolymers of (A) polyesters of dicarboxylic acids and dihydric alcohols and (B) monomers which are soluble in, or compatible with said polyesters and which contain a $>C=CH_2$ group. The invention has particular relation to interpolymerizable mixtures of the foregoing type, or the products of interpolymerization derived therefrom, which have a relatively high resistance to discoloration upon aging.

A very common resinifiable composition enjoying an extensive and rapidly increasing popularity comprises mixtures of (A) polyesters of alpha-beta ethylenically unsaturated dicarboxylic acids such as maleic or fumaric acids and glycols such as propylene glycol or diethylene glycol and (B) monomers, such as styrene or vinyl acetate, containing $>C=CH_2$ groups, preferably, attached to a negative radical, said monomers being compatible with and interpolymerizable with said polyesters. These interpolymerizable mixtures are liquid and can readily be poured into molds or spread upon, or impregnated into fabrics and mats of fibers of various types. The mixtures, when so applied, can easily be cured by a heating or baking operation in the absence of, or substantial absence of externally applied pressures, to form hard and strong resinous bodies of high utility. These bodies, in the absence of added opacifying materials or coloring matter such as pigments or other fillers, are clear and of but little or no color. For these reasons, they are of exceptional merit for the manufacture of transparent articles, such as transparent sheets, airplane canopies, or windows and many other uses.

While these products are highly serviceable and enjoy extensive and growing use, they are characterized by a slight tendency to undergo discoloration or yellowing upon aging, especially if such aging includes excessive exposure to ultra violet irradiation. In order to reduce the tendency of the foregoing interpolymerizable mixture to discolor, it has heretofore been suggested to incorporate into the mixtures prior to the curing operation, certain compounds termed light stabilizers, which have a capacity for reducing the tendency of the materials to discolor upon aging, but which in other respects do not substantially affect the properties of the materials.

This invention is based upon the discovery that certain esters of salicylic acid are highly effective as light stabilizers in the foregoing interpolymerizable mixtures. The aromatic esters, or the lower aliphatic esters where a benzene ring or an aliphatic group is directly joined to the oxygen bridge of the ester, are preferred and are represented by:

Phenyl salicylate
Methyl salicylate
Ethyl salicylate
Di-isopropylene glycol salicylate
Isoamyl salicylate
Isobutyl salicylate A salicylic acid ester such as phenyl salicylate is relatively inexpensive to obtain and possesses a high degree of solubility in the interpolymerizable mixture, or the polyester constituting a base resin therein, so that it can readily be introduced into the mixture to be stabilized, either hot or cold.

The interpolymerizable mixtures, with which the salicylic esters may be employed to increase light stability, comprise a relatively large and well-known class. The base component usually comprises, as previously indicated, a polyester of a glycol such as diethylene glycol, propylene glycol or polyethylene glycol and one or a plurality of dicarboxylic acids, at least a portion of which embody an ethylenic group in alpha-beta relationship with respect to at least one of the carboxyls. Acids of this latter type comprise maleic acid and fumaric acid in most resins. However, the invention includes the use of many other acids containing the group:

$$—C=C—C=O$$

Numerous polyesters and the mode of preparing the same are discussed in Patent 2,593,787 to Earl E. Parker issued April 22, 1952. As indicated in the patent, the polyester components may and as a matter of fact, usually do contain a dicarboxylic acid component which is free of ethylenic unsaturation, or other types of unsaturation which react by addition with $>C=CH_2$ groups. Examples of such acids are phthalic acid, terephthalic acid, or the saturated aliphatic dicarboxylic acids of the class represented by succinic acid, adipic acid, sebacic acid, azelaic acid, and the like. The invention also includes the use of dicarboxylic acids of the foregoing types in which one or more of the hydrogens of the rings or hydrocarbon chains are replaced by halogen atoms such as chlorine, or by methyl or ethyl groups, or other non-functioning groups. When they are employed, the proportion of saturated or non-ethylenic acids may vary over a broad range, e. g., 0.25 to 12 moles per mole of ethylenically unsaturated acids.

The preparation of the polyesters has now been well conventionalized and many of them constitute well recognized commercial products. Accordingly, the preparation of the polyester component does not require elaboration. It is sufficient to state that the polyester can readily be prepared by heating a mixture of a dihydric alcohol such as propylene glycol or diethylene glycol with the dicarboxylic acid or mixture of dicarboxylic acids in the presence of or absence of a catalyst of esterification such as litharge or an aromatic sulfonic acid. Usually, the reaction is conducted under an inert atmosphere such as an atmosphere of carbon dioxide or nitrogen. A small amount of a solvent medium such as xylene or toluene may be included. This solvent may be subjected to reflux distillation in which it operates azeotropically to remove water of reaction which can be condensed, separated mechanically from the solvent medium and the latter returned to the reaction mixture. The temperature of reaction normally is such as will produce esterification reaction at a reasonable rate, as can readily be determined by the evolution of water from the system. A temperature of about 100 to 250° C., more or less is quite effective. The reaction is continued until a polyester having an acid value in a reasonable range, e. g., 3 to about 50 is obtained. The polyester will usually be a very viscous or even solid product at normal atmospheric temperatures. The reaction usually is completed in a period of about 2 to 20 hours. In no event is the reaction continued so long as to produce an infusible insoluble product.

In conducting the reaction, the polyhydric alcohol component is employed in stoichiometric, or in slightly higher proportion (5 or 10 percent by weight excess) with respect to the sum of the carboxylic acid components.

Monomers suitable for use to provide an interpolymerizable mixture in accordance with the provisions of this invention are disclosed in the foregoing patent to Earl E. Parker. Preferred monomers are liquids containing a >C=CH$_2$ group attached to a negative radical and are soluble in, or compatible with the polyester component.

Styrene and styrene-like materials involving a >C=CH$_2$ group in a side chain attached to a benzene ring constitute an especially important class of monomers but esters and halides and other derivatives containing terminal >C=CH$_2$ groups are also effective for some applications. An appropriate list of the more common monomers is as follows:

TABLE A

1. Styrene
2. Alpha-methyl styrene
3. p-Methyl styrene
4. Divinyl benzene
5. Vinyl toluene Unsaturated esters such as:

6. Vinyl acetate
7. Methyl methacrylate
8. Methyl acrylate
9. Allyl acetate
10. Diallyl phthalate
11. Diallyl succinate
12. Diallyl adipate
13. Diallyl sebacate
14. Diethylene glycol bis(allyl carbonate)
15. Triallyl phosphate
16. Vinyl chloride Naturally, these are by no means comprehensive of the class but rather are in the nature of illustrations.

The monomers may conveniently be selected from those listed in the foregoing patent or they may be selected from the following general list:

(1) Monoolefinic hydrocarbons, that is, monomers containing only atoms of hydrogen and carbon, such as styrene, alpha-methyl styrene, alpha-ethyl styrene, alpha-butyl styrene and vinyl toluene, and the like;

(2) Halogenated monoolefinic hydrocarbons, that is, monomers containing carbon, hydrogen and one or more halogen atoms such as alpha-chlorostyrene, alpha-bromostyrene, 2,5-dichlorostyrene, 2,5-dibromostyrene, 3,4-dichlorostyrene, 3,4-difluorostyrene, ortho-, meta-, and para-fluorostyrenes, 2,6-dichlorostyrene, 2,6-difluorostyrene, 3-fluoro-4-chlorostyrene, 3-chloro-4-fluorostyrene, 2,4,5-trichlorostyrene, dichloromonofluorostyrenes, chloroethylene (vinyl chloride), 1,1-dichloroethylene (vinylidene chloride), bromoethylene, fluoroethylene, iodoethylene, 1,1-dibromoethylene, 1,1-difluoroethylene, 1,1-diiodoethylene, and the like;

(3) Esters of organic and inorganic acids such as vinyl acetate, vinyl propionate; vinyl butyrate, vinyl isobutyrate, vinyl valerate, vinyl caproate, vinyl enanthate, vinyl benzoate, vinyl toluate, vinyl p-chlorobenzoate, vinyl o-chlorobenzoate, vinyl m-chlorobenzoate and similar vinyl halobenzoates, vinyl p-methoxybenzoate, vinyl o-methoxybenzoate, vinyl p-ethoxybenzoate, methyl methacrylate, ethyl methacrylate, propyl methacrylate, butyl methacrylate, amyl methacrylate, hexyl methacrylate, heptyl methacrylate, octyl methacrylate, decyl methacrylate, methyl crotonate, ethyl crotonate and ethyl tiglate, methyl acrylate, ethyl acrylate, propyl acrylate, isopropyl acrylate, butyl acrylate, isobutyl acrylate, amyl acrylate, hexyl acrylate, 2-ethyl-hexyl acrylate, heptyl acrylate, octyl acrylate, 3,5,5-trimethylhexyl acrylate, decyl acrylate and dodecyl acrylate, isopropenyl acetate, isopropenyl propionate, isopropenyl butyrate, isopropenyl isobutyrate, isopropenyl valerate, isopropenyl caproate, isopropenyl enanthate, isopropenyl benzoate, isopropenyl p-chlorobenzoate, isopropenyl o-bromobenzoate, isopropenyl m-chlorobenzoate, isopropenyl toluate, isopropenyl alpha-chloroacetate and isopropenyl alpha-bromopropionate;

Vinyl alpha-chloroacetate, vinyl alpha-bromoacetate, vinyl alpha-chloropropionate, vinyl alpha-bromopropionate, vinyl alpha-iodopropionate, vinyl alpha-chlorobutyrate, vinyl alpha-chlorovalerate and vinyl alpha-bromovalerate;

Allyl chlorocarbonate, allyl formate, allyl acetate, allyl propionate, allyl butyrate, allyl valerate, allyl caproate, diallyl phthalate, diallyl succinate, diethylene glycol bis-(allyl-carbonate), allyl 3,5,5-trimethylhexoate, allyl benzoate, allyl acrylate, allyl crotonate, allyl oleate, allyl chloroacetate, allyl trichloroacetate, allyl chloropropionate, allyl chlorovalerate, allyl lactate, allyl pyruvate, allyl aminoacetate, allyl acetoacetate, allyl thioacetate, diallyl-3,4,5,6,7,7-hexachoro Δ4 endomethylene tetrahydrophthalate, as well as methallyl esters corresponding to the above allyl esters, as well as esters from such alkenyl alcohols as beta-ethyl allyl alcohol, beta-propyl allyl alcohol, 1-buten-4-ol, 2-methyl-buten-1-ol-4, 2(2,2-dimethylpropyl)-1-buten-4-ol and 1-pentene-4-ol;

Methyl alpha-chloroacrylate, methyl alpha-bromoacrylate, methyl alpha-fluoroacrylate, methyl alpha-iodoacrylate, ethyl alpha-chloroacrylate, propyl alpha-chloroacrylate, isopropyl alpha-bromoacrylate, amyl alpha-chloroacrylate, octyl alpha-chloroacrylate, 3,5,5-trimethylhexyl alpha-chloroacrylate, decyl alpha-chloroacrylate, methyl alpha-cyano acrylate, ethyl alpha-cyano acrylate, amyl alpha-cyano acrylate and decyl alph-cyano acrylate;

Dimethyl maleate, diethyl maleate, diallyl maleate, dimethyl fumarate, dimethallyl fumarate and diethyl glutaconate;

(4) Organic nitriles such as acrylonitrile, methacrylonitrile, ethacrylonitrile, crotonitrile, and the like;

(5) Acid monomers such as acrylic acid, methacrylic acid, crotonic acid, 3-butenoic acid, angelic acid, tiglic acid and the like;

(6) Amides such as acrylamide, alpha-methyl acrylamide, N-phenyl acrylamide, N-methyl, N-phenyl acrylamide, and the like.

The preferred monomers are liquid compounds soluble in the polyester component. They will contain the

>C=CH$_2$ group and preferably the latter will be attached to a negative radical such as a benzene ring, a chlorine atom, an ester linkage, a nitrile group or the like. They should be free of carbon-carbon conjugated double bonds.

The monomer component, or components may be employed over a relatively broad range, but usually, the proportion thereof upon a weight basis will be less than the polyester component. Usually, the percentage of monomer will fall within a range of about 10 to 45 or 50 percent by weight of the total mixture of polyester and monomer. The preferred range of monomer is about 20 to 40 percent, in most instances.

Since the polyester component is usually highly viscous or even solid at normal atmospheric temperatures, it is preferred to add the monomer to the polyester when the latter is heated to or above the fusion temperature. Normally, the temperature of addition of monomer will be above 100° C. and may conveniently be at a temperature of about 120° C. At these temperatures the system is relatively fluid and the several components can readily be incorporated into each other to provide a homogeneous solution. At these temperatures it is manifested that the polyester and the monomer are highly reactive even in the absence of catalysts of addition reaction such as benzoyl peroxide or other free radical initiators. Accordingly, it is preferred to effect the mixing operation while one or both of the components contains a gelation inhibitor such as one of the quaternary ammonium compounds selected from the following list disclosed in the foregoing patent to Earl E. Parker.

TABLE B

Trimethyl benzyl ammonium acetate
Trimethyl benzyl ammonium chloride
Trimethyl benzyl ammonium bromide
Triethyl benzyl ammonium chloride
Tripropyl benzyl ammonium chloride
Tributyl benzyl ammonium chloride
Cetyl trimethyl ammonium chloride
Octadecyl trimethyl ammonium chloride
Trimethyl benzyl ammonium chloride
Lauroyl pyridinium chloride
Phenyl trimethyl ammonium chloride
Tolyl trimethyl ammonium chloride
Benzyl trimethyl ammonium phosphate
Benzyl trimethyl ammonium iodide
Ethyl pyrodinium chloride
Phenyl trimethyl ammonium chloride
Octyl trimethyl ammonium bromide
Ethylene bis(pyridinium chloride)
Ethylene bis(trimethyl ammonium bromide)
Trimethyl benzyl ammonium oxalate
Trimethyl benzyl ammonium maleate
Trimethyl benzyl ammonium tartrate
Trimethyl benzyl ammonium lactate
Trimethyl benzyl ammonium chloride
Diisobutyl-phenoxy-ethoxy-ethyl dimethyl benzyl ammonium chloride Other inhibitors which may be so used, include phenolic compounds such as hydroquinone, p-benzoquinone, tertiary butyl catechol, 3-isopropyl catechol, 4-isopropyl catechol and others. These inhibitors may be employed in amounts effective to prevent premature gelation to a reasonable degree. Excesses may be employed, but naturally they increase costs and increase curing time. Effective amounts, of course, will depend upon the reactivity of the polyestermonomer systems, the potency of the inhibitor and such like factors. Usually the inhibitor need not be empolyed in an amount in execss of 1 percent by weight based upon the interpolymerizable components employed. In most instances the inhibitor should be employed in an amount above about 0.001 percent by weight upon a like basis.

It will be appreciated that esters of salicylic acid themselves often have some effect as inhibitors of gelation and for that reason, it is sometimes permissible to reduce the proportion of the conventional gelation inhibitor in the interpolymerizable mixture substantially below the amount which would be required in the absence of esters of salicylic acid.

The stabilizer against discoloration by light, such as the phenyl ester of salicylic acid may be added to the interpolymerizable mixture at the time that the latter is formulated, or it may be added to a component such as the polyester component before the addition of the monomer. As previously indicated, the salicylic ester is soluble in the interpolymerizable mixture or the polyester component even at normal room temperatures and may be added to the mixture at any stage of storage before the mixture is actually subjected to interpolymerization reaction.

In selecting the proportion of salicylic acid ester for a specific interpolymerizable mixture due regard should be given to the degree of stability required. Also, it will be apparent that in many cases, the products of the interpolymerizable mixtures, because of the differences in the components thereof, vary in their tendency to become discolored. Some components, when incorporated into the mixtures, may result in products which are less subject to discoloration and aging than others. Usually, an adequate degree of light stability can be attained by incorporation of about 0.1 to 5 percent of the salicylic acid ester. In general, about 1 per cent by weight based upon the interpolymerizable mixture is effective.

Interpolymerizable mixtures of polyesters and monomers containing a small amount of a salicylic acid ester such as phenyl salicylate added at any desired stage to a component of the mixture, either hot or cold, or to the mixture during, or subsequent to its preparation, can be stored for use as desired. When the mixture is to be employed in the preparation of castings, laminates, or similar articles, it is preferred to add a catalyst such as one of the free radical initiators and being represented by benzoyl peroxide, tertiary butyl hydroperoxide, cyclohexyl hydroperoxide, acetyl peroxide, cumene hydroperoxide, and many others. Soluble salts of cobalt, lead, manganese, nickel and many other similar metals are often employed with the catalysts as promoters of free radical formation. The naphthenates, linoleates and such like salts of the metals which are soluble in the polyesters and are catalysts of drying in unsaturated glyceride oils conveniently may be employed in small but effective catalytic amounts, to enhance the action of the peroxides, or hydroperoxides. The salicylic acid esters, such as phenyl salicylate, are particularly effective when employed in compositions containing such soluble salts of drier metals.

The free radical initiator usually is employed in an amount within a range of about 0.01 to 5 percent by weight based upon the interpolymerizable mixture. Amounts of approximately 0.1 to 3 percent by weight of the free radical initiator are deemed to be especially effective.

The interpolymerizable mixtures of polyesters containing the alpha-beta group and the monomers containing >C=CH$_2$ groups and containing inhibitors of gelation as well as phenyl salicylate and free radical initiators, in accordance with the provisions of the present invention, can readily be poured into molds since they are normally liquid homogenous mixtures. They can also be employed to impregnate fabrics such as fabrics of glass or of organic materials, e. g., cotton or the like. They may also be employed to impregnate bats and preforms of heterogeneously disposed fibers.

The mixtures in molds, or on fabrics, or supported in any other convenient way may be caused to undergo rapid interpolymerization, or curing by the application of relatively mild heat, for example, a temperature of about 75° to 150° C., or thereabouts. In most instances, temperatures of about 90° C. to 100° C. are quite effective in producing gelling and ultimate curing of the mixtures to hard resinous state. The time required for curing will vary greatly, dependent upon the reactivity of the polyestermonomer mixture, the activity of the catalysts or free radical initiator, the gelation inhibitor and the amount thereof, the temperature of interpolymerization, and the thickness of the body of the mixture to be cured. Usually, the cures can be effected within a period of a few minutes, e. g., 2 or 3 minutes to 1 or 2 hours. If desired, the mixtures, or the bodies containing the mixtures, can be cured in two stages. In the first stage, cure is effected with or without a mold, as may be required, and at a moderate temperature, e. g., 90 to 100° C. to provide self-supporting body which is ultimately hardened by a baking operation in an oven at a temperature of about 125 to 150° C. A convenient baking schedule involves a time cycle of 5 or 10 minutes to about 2 hours dependent upon the size of the article to be finished, hardness desired and other factors.

The interpolymerizable mixtures of this invention containing a salicylic acid ester as an inhibitor of discoloration may be employed to prepare clear castings useful as objects of art, e. g., as figurines, ornaments, or the like. They may also be used as embedment media for protectively embedding flowers, biological specimens, keepsakes and numerous other articles. Still other uses involve the casting of thin, transparent sheets in planar or curvalinear form useful for glazing purposes such as in automobiles, trains, boats, airplanes and the like. The bodies containing reinforcing materials such as glass fibers, cotton fibers, or any other similar materials may be used as laminates, for example, in instrument panels used in the construction of automobiles, airplanes or as wing coverings and such like purposes. In the transparent articles, the interpolymers retain their high clarity and freedom from yellowing or other discoloration remarkably well, even when the articles are subjected to relatively high intensities of ultra-violet irradiation. The reinforced plastics usually are lacking in transparency; but the freedom from discoloration often is desirable for esthetic or other reasons.

It will be apparent that the uses of the interpolymerizable mixtures above discussed are merely by way of suggestion. These constitute only a few of the numerous applications to which the materials are susceptible of application.

Illustrations of the use of the phenyl ester of the salicylic acid known commercially as Salol as an inhibitor of discoloration are contained in the following examples:

*Example I*

The interpolymerizable mixture of this example comprised a product containing a polyester obtained by the reaction of:

| Component: | Moles |
|---|---|
| Maleic anhydride | 4 |
| Phthalic anhydride | 6 |
| Propylene glycol | 11 |

The mixture was cooked under an inert atmosphere and 0.1 percent by weight based on the above mixture of triphenyl phosphite (an optional ingredient) and hydroquinone (0.01 percent by weight based upon the above mixture) was also added. The mixture was cooked until water ceased to evolve and an adequate viscosity was attained. This polyester, in a proportion of 65 parts by weight, was mixed with 35 parts by weight of styrene. A control sample of this material was prepared and to it was added 0.3 percent by weight based upon the total mixture of tertiary butyl peroxide.

A second sample of the same composition contained 1 percent by weight (based upon the total composition) of phenyl ester of salicylic acid. The latter could be added to hot or cold mixtures. Both of these mixtures were poured into molds designed for the casting of resinous sheets and were cured at 170° F. until a solid resinous product was obtained. The sheet was further baked at 220° F. until the surface was hard and mar-resistant. These two products were transparent and of the type employed in airplane glazing and such like operations.

For purposes of determining their resistance to discoloration upon aging, they were subjected to a severe test involving exposure to high intensity ultra violet light for a period of 1000 hours. At the conclusion of this exposure, the sample containing 1 percent of phenyl salicylate had a color index of 32, while the control sample containing no inhibitor of discoloration had a color index of 48. In the color scale, reduction of the number indicates an improvement in color. Therefore, phenyl salicylate was shown to be an effective inhibitor of discoloration.

*Example II*

In this example, an interpolymerizable mixture comprising 1 part by weight of styrene and 2 parts by weight of a polyester of 2 moles (or a slight excess thereof) of propylene glycol, 1 mole of maleic acid and 1 mole of phthalic acid was prepared. The mixture was stabilized against premature gelation with 0.1 percent based on the polyester of trimethyl benzyl ammonium chloride and 0.005 parts by weight based on the total composition of quinone, and 0.1 part by weight of triphenyl phosphite. The mixture was divided into a series of samples, one of which was employed as a control without added color inhibitor. To a second sample was added 1 percent by weight based upon the polyester component of phenyl salicylate and to a third sample was 0.5 percent by weight of the same material. These additions were effected while the polyester was at a temperature of 285° F. However, the additions could be effected while the mixtures were at normal room temperature with little effect on the results. These samples were stored for a period of 1 month and at the end of this time, 1 percent by weight based upon the interpolymerizable mixture of benzoyl peroxide was added. The mixtures were placed in molds and cured into sheets as in the preceding example.

The resultant sheets were then subjected to the conventional ASTM weathering tests in the so-called Weather-O-Meter and were exposed for periods respectively of 200, 500 and 1000 hours to irradiation by ultra violet light. The color index of the samples per centimeter of thickness was determined and the readings are respectively as follows:

| | 0 Hours | 200 Hours | 500 Hours | 1,000 Hours |
|---|---|---|---|---|
| Control | 23 | 45 | 55 | 66 |
| 1.0 phenyl salicylate | 28 | 34 | 36 | 43 |
| 0.5 phenyl salicylate | 26 | 33 | 35 | 49 |

The tests clearly indicate the effect of phenyl salicylate as an inhibitor of discoloration of the compositions. The composition so inhibited would be valuable in the preparation of plastic sheets for glazing airplanes. The several examples are by way of illustration.

It will be apparent that in these examples, other polyesters of alpha-beta ethylenic dicarboxylic acids, and other monomers may be substituted for those specifically referred to. For example:

In the polyesters, glycols such as diethylene glycol, polyethylene glycol or the like can be employed. Maleic acid can be replaced by fumaric acid or itaconic acid; phthalic acid can be eliminated, or replaced by sebacic or adipic, or other dicarboxylic acid in molecularly equivalent amount. Various monomers such as vinyl acetate, vinyl chloride, methyl methacrylate, diallyl phthalate and many others, may be substituted in part or in toto for styrene. Phenyl salicylate may be replaced, in the preceding examples, by methyl salicylate, ethyl salicylate, diisopropylene glycol salicylate, isoamyl salicylate, isobutyl salicylate, tolyl salicylate, xylyl salicylate and others, though the phenyl salicylate is presently preferred.

These and many other modifications of the invention will be apparent to those skilled in the art as being embraced within the scope of the following claims.

I claim:

1. A hard resinous product having a high color stability and comprising an interpolymer of (A) a polyester of a dihydric alcohol and an alpha-beta ethylenic dicarboxylic acid (B) a monomer containing a >C=CH$_2$ group and (C) an ester of salicylic acid said ester being incorporated in the interpolymer.

2. An interpolymerizable mixture of (A) a polyester of a dihydric alcohol and an alpha-beta ethylenic dicarboxylic acid (B) a monomer containing a >C=CH$_2$ group and (C) an ester of salicylic acid and a phenol said ester being in solution in the mixture.

3. An interpolymerizable mixture of (A) a polyester of a dihydric alcohol and an alpha-beta ethylenic dicarboxylic acid (B) a monomer containing a >C=CH$_2$ group and (C) phenyl salicylate, said phenyl salicylate being employed in an amount to impart color stability to the interpolymer of the mixture and being in solution in the latter.

4. In the method of imparting color stability to an interpolymerizable mixture of (A) a polyester of a dihydric alcohol and a carboxylic acid at least some of which contains alpha-beta ethylenic unsaturation and (B) a monomer containing a >C=CH$_2$ group, the step of adding to said mixture a small stabilizing amount of an ester of salicylic acid said ester being in solution in the mixture.

5. An interpolymerizable mixture of (A) a polyester of a dihydric alcohol and a mixture of dicarboxylic acids, one of which is alpha-beta ethylenically unsaturated and the second of which is free of such unsaturation (B) a monomer containing a >C=CH$_2$ group and (C) an ester of salicylic acid adapted to impart color stability to the product of interpolymerization of said mixture said ester being in solution in the mixture.

6. A hard resinous interpolymer obtained by heating the mixture defined in claim 5 in the presence of a free radical initiator as a catalyst.

7. An interpolymerizable mixture as defined in claim 6 in which the polyester is of propylene glycol and a mixture of maleic acid and phthalic acid.

8. In a method of forming resinous products resistant to discoloration by irradiation, the steps of forming a liquid mixture of (A) a polyester of a dihydric alcohol and an alpha-beta ethylenic dicarboxylic acid (B) a monomer containing a >C=CH$_2$ group (C) phenyl salicylate (D) a peroxidic free radical initiator (E) a soluble salt of metal which is a siccative for drying oils, and heating the mixture to cure the same to hard resinous state.

References Cited in the file of this patent

UNITED STATES PATENTS

| | | |
|---|---|---|
| 2,617,748 | Bjorksten et al. | Nov. 11, 1952 |
| 2,627,510 | Parker | Feb. 3, 1953 |